UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

BLUE-BLACK DISAZO DYE.

SPECIFICATION forming part of Letters Patent No. 525,626, dated September 4, 1894.

Application filed June 2, 1894. Serial No. 513,284. (Specimens.) Patented in France March 28, 1892, No. 220,468, and in England August 6, 1892, No. 14,253.

*To all whom it may concern:*

Be it known that I, JAKOB SCHMID, a subject of the Queen of Great Britain, residing at Basle, Switzerland, have invented new and useful Improvements in the Production of Blue-Black Disazo Dye-Stuffs or Coloring-Matters, (for which Letters Patent were obtained in France, dated March 28, 1892, No. 220,468, and in England, dated August 6, 1892, No. 14,253,) of which the following is a specification.

My invention relates to the production of useful blue black disazo dyestuffs obtained by the condensation of the intermediate products, resulting from one molecule of monosulfodioxy naphtoic acid, (American Patent No. 493,562, dated March 14, 1893,) and one molecule of the tetrazo derivatives of benzidin, tolidin, ethoxybenzidin and dianisidin in an alkaline solution, with one molecule of an amidonaphthol sulfo acid, such as a (2.8) amidonaphthol (6) monosulfo acid G, (2.8) amidonaphthol (3.6) disulfo acid 2R, (1.8) amidonaphthol (3.6) disulfo acid.

My way of proceeding is as follows: 1.84 kilos of benzidin, or 2.12 kilos of tolidin or 2.4 kilos of dianisidin or 2.28 kilos of ethoxybenzidin are diazotized with 1.4 kilos of sodium nitrite and six kilos of muriatic acid in a cooled aqueous solution. The resulting tetrazo compound is introduced into a solution of 2.84 kilos of monosulfo dioxynaphthoic acid and eight kilos of soda salt in fifty liters of water and allowed to stand for about one hour until the intermediate product is formed; then a solution of 2.6 kilos of (2.8) amido-naphthol (6) monosulfo acid G, or 3.5 kilos of 2.8 amidonaphthol (3.6) disulfo acid 2R or 3.5 kilos of (1.8) amido naphthol (3.6) disulfo acid H and two kilos of soda salt in two hundred liters of water are added. The formation of the new coloring matter begins immediately and is complete after about twelve hours.

By heating and adding forty kilos of common salt, filtering off and drying the new dyestuffs are obtained and correspond to the general chemical composition:

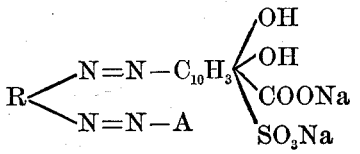

where R signifies the radicle of the tetrazotized benzidin, tolidin, ethoxybenzidin or dianisidin, and A the amidonaphthol sulfo acid used. These coloring matters, possessing besides the radicle of monosulfo-dioxy naphthoic acid and also the radicle of amidonaphthol sulfo acid, may be developed on the fiber with pyrolignite of iron as well as by rediazotizing and treatment with amins or phenols.

The dyestuffs form dark powders of metallic luster dissolving with a blue to dark green color in concentrated sulfuric acid from which a precipitate separates by the addition of water. The new coloring matters are insoluble in alcohol, ether and benzene, dissolve easily in hot water with a violet black to black-blue coloration and dye blue-black tints on unmordanted cotton and on wool.

What I claim as new, and desire to secure by Letters Patent, is—

The within described blue black disazo coloring matters which can be obtained by the condensation of the intermediate compound, resulting from one molecule of monosulfodioxynaphthoic acid and one molecule of tetrazotized benzidin, tolidin, ethoxybenzidin or dianisidin with one molecule of one of the aforementioned amidonaphthol sulfo acids in an alkaline solution, corresponding to the general chemical composition:

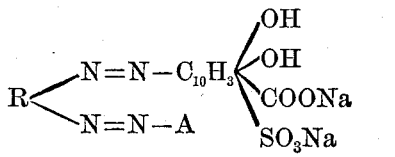

where R signifies the radicle of the tetrazobody and A the amido naphtholsulfo acid used, forming dark powders of metallic luster, which are insoluble in alcohol, ether and benzine, easily soluble in hot water with a violet to blue black coloration; also soluble in concentrated sulphuric acid, from which a precipitate separates out by the addition of water.

In testimony whereof I have hereunto set my hand in the presence of two subscribing witnesses.

JAKOB SCHMID.

Witnesses:
   GEORGE GIFFORD,
   THEODORE H. ACHELER.